(12) United States Patent
Kusumi et al.

(10) Patent No.: US 9,719,805 B2
(45) Date of Patent: Aug. 1, 2017

(54) POSITION DETECTING DEVICE

(71) Applicant: DMG MORI SEIKI CO., LTD., Yamato-Koriyama, Nara (JP)

(72) Inventors: Masaaki Kusumi, Isehara (JP); Yusuke Takei, Isehara (JP); Shigeru Ishimoto, Isehara (JP)

(73) Assignee: DMG MORI SEIKI CO., LTD., Yamato-Koriyama (JP)

( * ) Notice: Subject to any disclaimer, the term of this patent is extended or adjusted under 35 U.S.C. 154(b) by 28 days.

(21) Appl. No.: 14/731,079

(22) Filed: Jun. 4, 2015

(65) Prior Publication Data
US 2015/0354987 A1  Dec. 10, 2015

(30) Foreign Application Priority Data

Jun. 9, 2014 (JP) .................. 2014-119043

(51) Int. Cl.
*G01D 5/16* (2006.01)
*G01D 5/14* (2006.01)
*G01D 5/244* (2006.01)

(52) U.S. Cl.
CPC ............... *G01D 5/16* (2013.01); *G01D 5/145* (2013.01); *G01D 5/24438* (2013.01)

(58) Field of Classification Search
CPC combination set(s) only.
See application file for complete search history.

(56) References Cited

U.S. PATENT DOCUMENTS

| | | | |
|---|---|---|---|
| 4,361,805 A | 11/1982 | Narimatsu et al. | |
| 4,616,281 A * | 10/1986 | Nakamura | G01B 7/023 324/207.21 |
| 5,208,535 A | 5/1993 | Nakayama et al. | |
| 2003/0030522 A1 | 2/2003 | Kasashima et al. | |
| 2007/0188946 A1 * | 8/2007 | Shoji | B82Y 25/00 360/324.12 |
| 2009/0033946 A1 | 2/2009 | Kon et al. | |

FOREIGN PATENT DOCUMENTS

| | | |
|---|---|---|
| EP | 0493260 A1 | 7/1992 |
| EP | 2020591 A2 | 2/2009 |
| JP | 2009-036637 A | 2/2009 |

OTHER PUBLICATIONS

Oct. 15, 2015 Extended Search Report issued in European Patent Application No. 15170936.7.

* cited by examiner

*Primary Examiner* — Clayton E Laballe
*Assistant Examiner* — Jas Sanghera
(74) *Attorney, Agent, or Firm* — Oliff PLC

(57) ABSTRACT

A highly accurate position detection is performed by the use of a magneto-resistance effect element such as a TMR element.

At least two magnetic detecting elements 21-1 and 21-2 are provided to detect leakage magnetism from a scale 11 having a magnetic signal magnetically recorded thereon, and to output a recording signal of a position where the leakage magnetism is detected. The at least two magnetic detecting elements 21-1 and 21-2 are disposed side by side in a direction y perpendicular to a direction x of scanning the scale 11 and also disposed at positions approximately equidistant from a magnetic signal recording surface of the scale 11.

2 Claims, 11 Drawing Sheets

ARRANGEMENT EXAMPLE OF DETECTING ELEMENTS

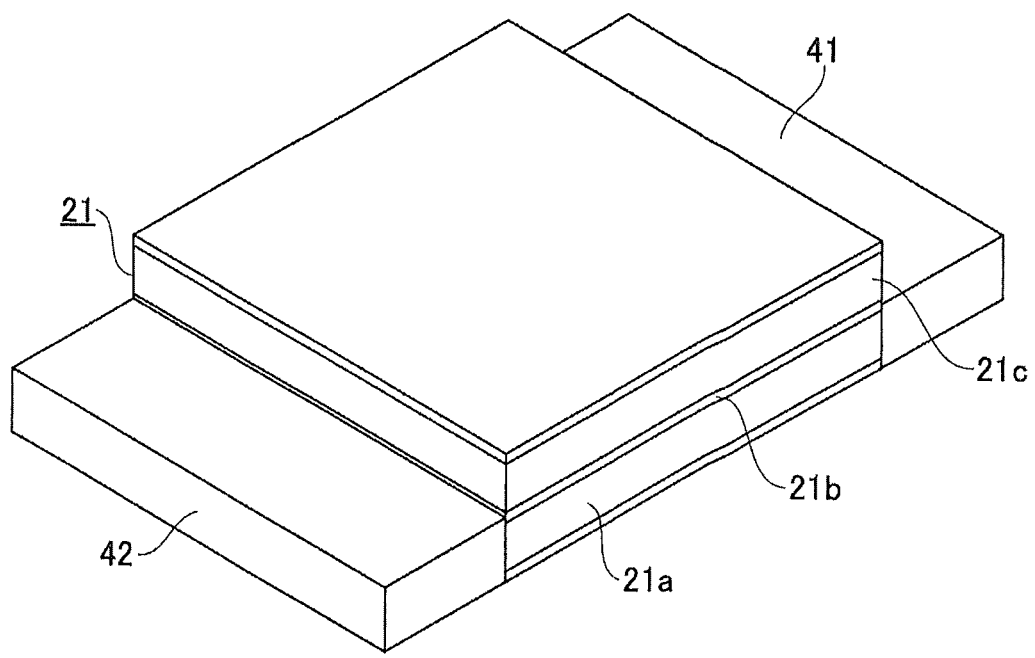
CONFIGURATION EXAMPLE OF DETECTING ELEMENT

STATE OF APPLYING BIAS MAGNETIC FIELD

STATE OF DETECTING ONE SCALE MAGNETIC FIELD

STATE OF DETECTING OTHER SCALE MAGNETIC FIELD

MAGNETIZATION STATE

RESISTANCE

VOLTAGE

RESISTANCE

VOLTAGE

VOLTAGE

PRIOR ART (A) ELEMENT ARRANGEMENT VIEWED FROM ABOVE    PRIOR ART (B) ELEMENT ARRANGEMENT VIEWED IN CROSS-SECTION    PRIOR ART

PRIOR ART

POSITION DETECTING DEVICE

CROSS REFERENCES TO RELATED APPLICATIONS

The present invention contains subject matter related to Japanese Patent Applications JP 2014-119043, filed in the Japanese Patent Office on Jul. 9, 2014, respectively, the entire contents of which being incorporated herein by reference.

BACKGROUND OF THE INVENTION

Field of the Invention

The present invention relates to a position detecting device to detect a relative position of a magnetic detecting element with respect to a magnetic scale.

Description of the Related Art

Conventionally, there has been known a position detecting device provided with a magnetic scale and a magnetic detecting element, as a position detecting device to detect an accurate displacement position of linear displacement, rotational displacement, or the like. The position detecting device is widely utilized for an electronic component mounting device which requires a highly-accurate positioning control of a conveyed object, a detecting (measuring) device which detects (measures) a size of a component, and the like, for example.

FIG. 15 is a diagram showing an arrangement example of a magnetic scale and magnetic detecting elements of a conventional magnetic-type position detecting device. The example of FIG. 15 shows a case of detecting linear displacement and includes a magnetic scale 1 configured with a magnetic medium. In the magnetic scale 1, magnetization directions of an S-pole and an N-pole are inverted every certain distance. One repetition unit of the S-pole and the N-pole is one wavelength of a recording signal of the magnetic scale 1.

The position detecting device includes a detecting section 2 where magnetic detecting elements 3a to 3h are disposed, at a position close to the magnetic scale 1. An AMR (Anisotropic Magneto-Resistance) element utilizing an anisotropic magneto-resistance effect is used for the magnetic detecting elements 3a to 3h, for example. In the magnetic detecting device, the magnetic scale 1 is disposed on the fixed side and the detecting section 2 is disposed on the movable side, and the position detecting device is configured to detect a relative position of the detecting section 2 with respect to the magnetic scale 1.

FIG. 16 is a diagram showing an arrangement example of the eight magnetic detecting elements 3a to 3h. FIG. 16A shows an element arrangement of the magnetic scale 1 viewed from the upper face of the magnetic scale 1, and FIG. 16B is the element arrangement of the magnetic scale 1 viewed in the cross-sectional direction.

The magnetic scale 1 is magnetized to have the N-poles and the S-poles at a certain interval in the longitudinal direction. Then, a magnetic signal to be detected by the detecting section 2 has a wavelength λ corresponding to one period in which the N-pole and the S-pole change. An electric signal outputted by the detecting section 2 has a pitch P corresponding to a half of the wavelength λ. The N-poles and the S-poles are arranged linearly at an interval of one pitch.

The four magnetic detecting elements 3a to 3d are adjacently disposed close to the magnetic scale 1. For the arrangement interval of the four magnetic detecting elements 3a to 3d, as shown in FIG. 16A, the two magnetic detecting elements 3a and 3b are arranged having an interval of one pitch P, and the other two magnetic detecting elements 3c and 3d are arranged having an interval of one pitch P. Then, the magnetic detecting element 3a and the magnetic detecting element 3c are disposed at positions (n+½)P apart from each other, in which n is an integer. The four magnetic detecting elements 3a to 3d are connected in series. A series circuit connecting the four magnetic detecting elements 3a to 3d in series is connected between a point of a predetermined potential V and an earth potential portion GND, and a signal Ch+ is taken out from a middle point of the series circuit (i.e., connection point of the magnetic detecting elements 3b and 3c).

Moreover, the other four magnetic detecting elements 3e to 3h are disposed apart from the four magnetic detecting elements 3a to 3d by a certain distance (m+½)P, in which m is an integer. The four magnetic detecting elements 3e to 3h are connected in series having the same arrangement interval as the magnetic detecting elements 3a to 3d. Then, a series circuit connecting the four magnetic detecting elements 3e to 3h in series is connected between the point of the predetermined potential V and the earth potential portion GND, and a signal Ch− is taken out from a middle point of the series circuit (i.e., connection point of the magnetic detecting elements 3f and 3g).

FIG. 17 is a diagram showing a connection configuration to obtain the detection signals from the eight magnetic detecting elements 3a to 3h.

The signal Ch+ obtained from the middle point of the four magnetic detecting elements 3a to 3d and the signal Ch− obtained from the middle point of the four magnetic detecting elements 3e to 3h are supplied to an operational amplifier 4. In the operational amplifier 4, both of the signals Ch+ and Ch− are amplified and taken out as a detection signal.

By taking out the signals detected by the magnetic detecting elements 3a to 3h using the configuration shown in the FIG. 16 and FIG. 17, it is possible to obtain the detection signal for detecting the relative position with respect to the magnetic scale. That is, pairs of the elements 3a and 3b and the elements 3c and 3d among the four magnetic detecting elements 3a to 3d are arranged having an interval corresponding to one fourth of one wavelength of the recording signal, and thereby signal changes detected in the respective pairs have opposite phases. That is, the signal Ch+ taken out from the middle point of the series circuit configured with the four magnetic detecting elements 3a to 3d and the signal Ch− taken out from the middle point of the series circuit configured with the four magnetic detecting elements 3e to 3h have phases opposite to each other.

Moreover, the signals Ch+ and Ch− are supplied to the operational amplifier 4, and the amplified detection signal is obtained from the operational amplifier 4. Here, by the amplification configuration of the operational amplifier 4 using a bridge configuration as shown in FIG. 17, the detection signal can be obtained stably from the operational amplifier 4, and it is possible to contribute to the improvement of a position detection accuracy. That is, since the variation of a resistance value in each of the elements with respect to temperature change can be canceled, the detection signal becomes strong against the temperature change applied to the elements. Further, by the use of a differential amplifier as the operational amplifier 4, the signal level becomes approximately twice, and also, since noises having the same phase can be eliminated, it is possible to obtain a preferable detection signal which is strong against external disturbance noise.

Patent literature 1 describes an example of the above magnetic-type position detecting device.

Prior Art Literature

Patent literature 1: Japanese patent Laid-Open No. 2009-36637

SUMMARY OF THE INVENTION

Problem to be Solved by the Invention

Meanwhile, an AMR element conventionally employed in the position detecting device has the problem that a resistance change rate with respect to a magnetic field change is comparatively small. As shown in FIG. 15, suitable MR effect characteristics necessary for performing the position detection is secured by means of arranging the magnetic detecting elements 3a to 3h comparatively long in the width direction of the magnetic scale 1.

Accordingly, for arranging a large number of the magnetic detecting element 3a to 3h to obtain the stable detection signal as described above, it is necessary to dispose the respective magnetic detecting elements 3a to 3h at different positions shifted by at least one pitch P from each other.

Since the signal recorded on the magnetic scale 1 changes between the N-pole and the S-pole every one pitch, in principle, by addition or subtraction of the signals detected by plutal elements which are arranged at positions shifted by one pitch period, the detection signals having the same phase or the opposite phases can be obtained for the position detection.

However, since the recording signals on the magnetic scale 1 at respective positions have a strength variation to some extent, the absolute values of the two signals Ch+ and Ch– do not have perfectly equal levels. Therefore, the signal amplified in the operational amplifier 4 includes distortion to some extent, and there is the problem that the detection accuracy of the relative position of a head with respect to the magnetic scale 1 is deteriorated accordingly.

An object of the present invention is to provide a position detecting device capable of performing highly accurate position detection.

Means for Solving the Problem

A position detecting device of the present invention includes: a scale having a magnetic signal magnetically recorded on a magnetic medium; at least two magnetic detecting elements disposed to be able to scan a magnetic signal recording surface of the scale and configured to detect leakage magnetism from the scale; and a position detecting section configured to detect a position with respect to the scale using a signal outputted from a middle point which connects the at least two magnetic detecting elements.

The at least two magnetic detecting elements are configured with magneto-resistance effect elements in which a resistance value of one element decreases when a resistance value of the other element increases with respect to magnetism applied to the elements. The at least two magnetic detecting elements used in the position detecting device of the present invention are disposed side by side in a direction perpendicular to a direction of scanning the scale and also disposed at positions approximately equidistant from the magnetic signal recording surface of the scale.

Advantageous Effect of the Invention

According to the present invention, since the plural magnetic detecting elements are disposed side by side in a direction perpendicular to the direction of scanning the scale, the plural detection signals are obtained from the recording signal of the scale at the same position. Accordingly, it is possible to cause the signals detected by the respective magnetic detecting elements to have perfectly opposite phases, and to improve the performance of eliminating the external disturbance noise. Further, also when the strength of the signals recorded in the scale has a variation, the variation does not provide a bad influence to the detection signal, and, also from such a point, a preferable detection signal is obtained and position detection accuracy is improved.

BRIEF DESCRIPTION OF THE DRAWINGS

FIG. 4 is a perspective view showing a configuration example of the magnetic detecting element according to the first embodiment of the present invention.

DESCRIPTION OF THE PREFERRED EMBODIMENTS

1. First Embodiment

Hereinafter, a first embodiment of the present invention will be explained with reference to FIG. 1 to FIG. 8.

[1-1. Configuration Example of a Position Detecting Device]

Figure 1:
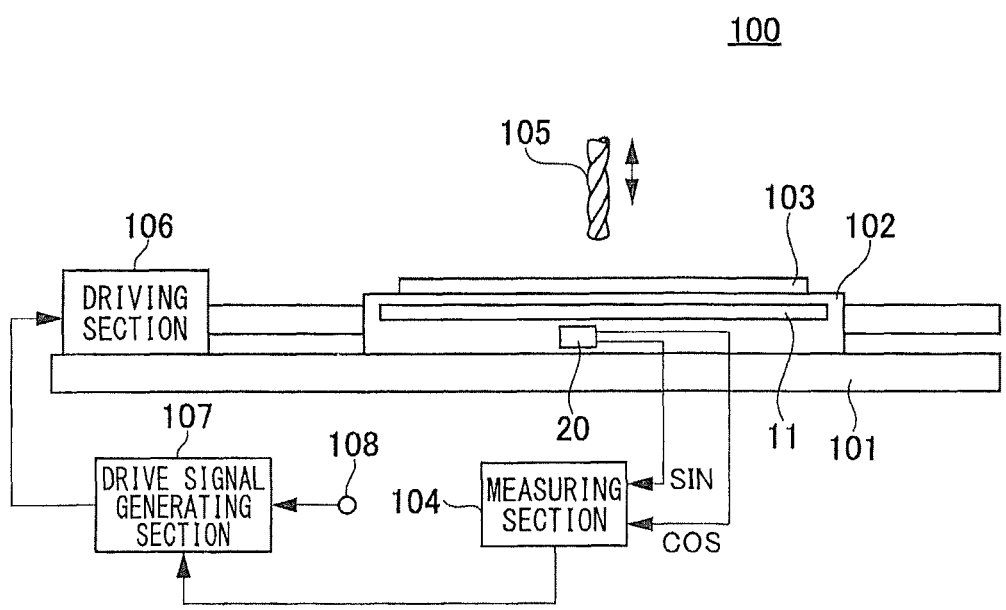
FIG. 1 is a configuration diagram showing an example of an entire mechanical configuration including a position detecting device according to a first embodiment of the present invention.

FIG. 1 is a diagram showing an example of an entire mechanical configuration including a position detecting device of the present example when the position detecting device is incorporated in a drive mechanism.

A device 100 shown in FIG. 1 is an application example of a machine tool. That is, the device 100 is configured to detect a movement distance of a movable stage 102 on a fixed portion 101 in a machine tool provided with the movable stage 102 which is disposed on the fixed portion 101 in a movable manner.

An object to be machined 103 is fixed on the movable stage 102, and the machining of the object to be machined 103 is performed by a machining tool 105. The position of the movable stage 102 is changed by the drive of a driving section 106.

A magnetic scale 11 is disposed on the movable stage 102. The magnetic scale 11 has a configuration in which a magnetic medium having recorded thereon a signal magnetizing the magnetic medium to have an N-pole and an S-pole alternately every certain distance is formed on the surface of a metal plate. The magnetic scale 11 is formed to have a length not smaller than the maximum distance of movement detection in the device 100.

Further, a detecting section 20 is disposed on the side of the fixed portion 101, and the detecting section 20 is disposed close to the magnetic scale 11. Then, a detecting element (magnetic detecting element 21 shown in FIG. 2) within the detecting section 20 detects the signal recorded on the magnetic scale 11. Here, the detecting section 20 includes a plurality of the magnetic detecting elements, and the respective magnetic detecting elements detect the recording signal of the magnetic scale 11 as a sine wave signal (SIN signal) and a cosine wave signal (COS signal). Here, the detecting section 20 is configured by arranging a plurality of the magnetic detecting elements 21 each including a TMR element (magnetic tunnel junction element).

The SIN signal and the COS signal detected by the detecting section 20 are supplied to a position detecting section 104, and the relative position of the detecting section 20 with respective to the magnetic scale 11 is calculated from the signals in the position detecting section 104. The position information calculated by the position detecting section 104 is supplied to a controlling section 107. The controlling section 107 calculates a difference between target position information input from a target position inputting section 108 and the position information supplied from the position detecting section 104, and generates a drive signal to move the movable stage 102 in a distance corresponding to the difference. Then, the drive signal generated by the controlling section 107 is supplied to the driving section 106. The driving section 106 moves the movable stage 102 in a movement amount indicated by the supplied drive signal.

[1-2. Arrangement Example of the Magnetic Detecting Elements]

Figure 2:
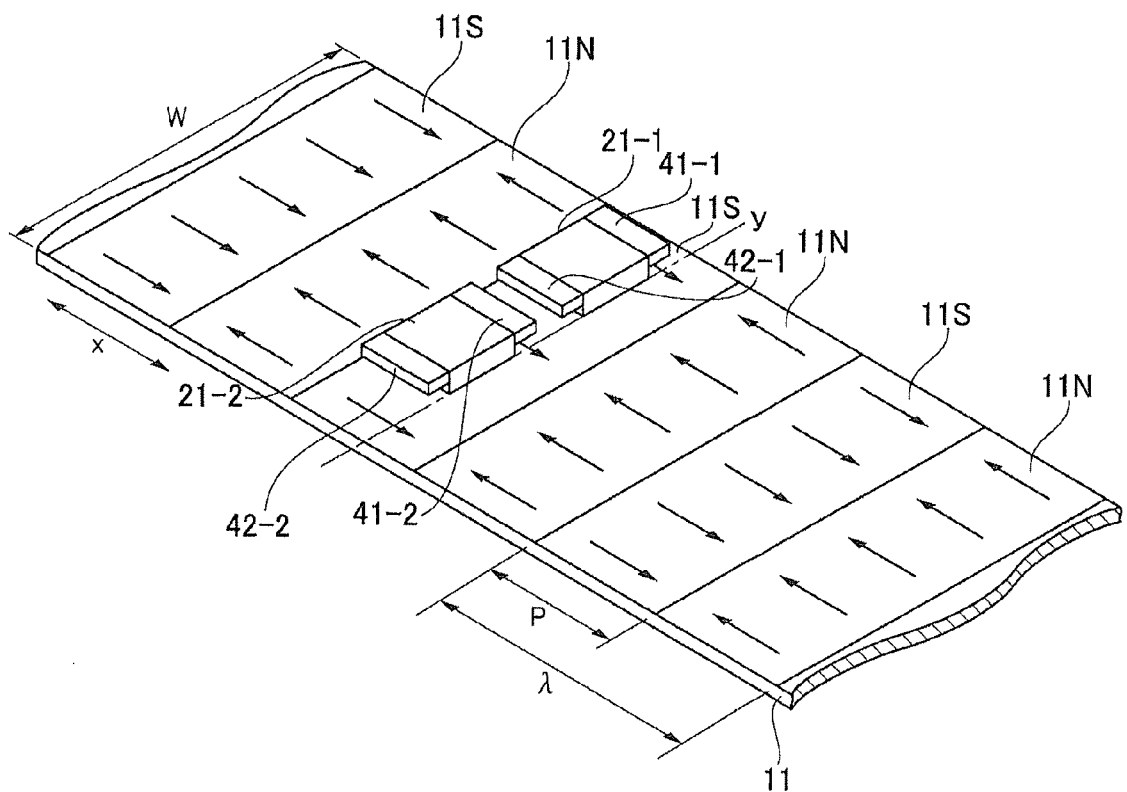
FIG. 2 is a perspective view showing an element arrangement example of the position detecting device according to the first embodiment of the present invention.
Figure 3:
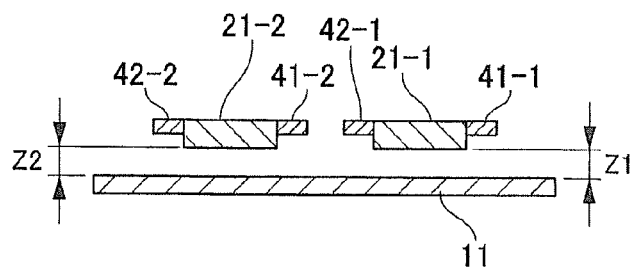
FIG. 3 is a cross-sectional view showing an element arrangement example of the position detecting device according to the first embodiment of the present invention.

FIG. 2 and FIG. 3 are diagrams showing an arrangement example of the magnetic detecting elements provided in the detecting section 20 (refer to FIG. 1) for the magnetic scale 11. FIG. 2 and FIG. 3 show an arrangement example of the magnetic detecting elements for obtaining the SIN signal. The magnetic detecting elements for obtaining the COS signal are also disposed in a similar arrangement at positions apart from the magnetic detecting elements for obtaining the SIN signal.

In the magnetic scale 11, N-pole magnetizing portions 11N and S-pole magnetizing portions 11S are arranged contiguously at a certain interval. As shown in FIG. 2, one period in which the N-pole and the S-pole change is one wave length λ. A half of one wavelength λ is one pitch P. Here, one wavelength λ is set to 400 μm.

The TMR element configuring the magnetic detecting element is an element utilizing the tunnel magneto-resistance effect (TMR effect). The TMR element has the advantage that the change of a resistance value with respect to magnetic field change is large, and, when the TMR element is applied to the magnetic detecting element 21 to detect a magnetic field leaking from the magnetic scale 11, it is possible to cause each of the magnetic detecting elements 21 to have a very small size. In the example here, two magnetic detecting elements 21 are used. In the following explanation, when the two magnetic detecting elements need to be referred to individually, one is referred to as a magnetic detecting element 21-1 and the other one is referred to as a magnetic detecting element 21-2.

In the example of FIG. 2, when the longitudinal direction of the magnetic scale 11 is defined as an x-direction, the two magnetic detecting elements 21-1 and 21-2 are disposed side by side linearly in a y-direction of the width direction perpendicular to the x-direction. Further, while FIG. 3 shows a cross section of FIG. 2 in they-direction, as shown in FIG. 3, the two magnetic detecting elements 21-1 and 21-2 are disposed at the same height from the surface of the magnetic scale 11. That is, a height z1 from the surface of the magnetic scale 11 to the magnetic detecting element 21-1 and a height z2 from the surface of the magnetic scale 11 to the magnetic detecting element 21-2 are assumed to be equal.

The same height of the two magnetic detecting elements 21-1 and 21-2 in such a manner can be realized by formation of the two magnetic detecting elements 21-1 and 21-2 disposed on the same substrate, for example.

Bias magnetic field generating portions 41-1 and 42-1 are disposed at positions neighboring the magnetic detecting element 21-1, and bias magnetic field generating portions 41-2 and 42-2 are disposed at positions neighboring the magnetic detecting element 21-2. The bias magnetic field generating portions 41-1, 41-2, 42-1, and 42-2 are formed each having a smaller thickness than the magnetic detecting elements 21-1 and 21-2, and are disposed at positions neighboring the upper layers (fixed layers 21a to be described below) of the respective magnetic detecting elements 21-1 and 21-2, as shown in FIG. 3, for example. Accordingly, the distance from the surface of the magnetic scale 11 to each of the bias magnetic field generating portions 41-1, 41-2, 42-1, and 42-2 is slightly larger than the distances z1 and z2 shown in FIG. 3. Influence provided to each of the magnetic detecting elements 21-1 and 21-2 from bias magnetic fields generated by the bias magnetic field generating portions 41-1, 41-2, 42-1, and 42-2 will be described below.

[1-3. Configuration of the Magnetic Detecting Element]

Next, there will be explained a configuration of the magnetic detecting element 21 provided in the detecting section 20, with reference to FIG. 4.

FIG. 4 is a diagram showing a configuration example of the magnetic detecting element 21 which is the TMR element.

As shown in FIG. 4, the magnetic detecting element 21 includes three layers of a fixed layer 21a, a barrier layer 21b, and a free layer 21c. Note that, in addition to the aforesaid three layers, the magnetic detecting element 21 also includes various other layers such as a wiring layer for extracting signals, a protection layer and the like, and explanation thereof will be omitted here.

The two bias magnetic field generating portions 41 and 42 are disposed for the magnetic detecting element 21. The two bias magnetic field generating portions 41 and 42 are configured to apply a bias magnetic field to the TMR element, and arranged so as to sandwich the magnetic detecting element 21. The bias magnetic field generating portions 41 and 42 are configured as an element integrated with the magnetic detecting element 21, for example. In the example of FIG. 4, each of the bias magnetic field generating portions 41 and 42 has approximately the same thickness as the fixed layer 21a of the magnetic detecting element 21, for example, and the bias magnetic field generating portions 41 and 42 are disposed at positions neighboring the fixed layer 21a. However, it is one example to cause the bias magnetic field generating portions 41 and 42 to have approximately the same thickness as the fixed layer 21a, and the bias magnetic field generating portions 41 and 42 may be formed each having another thickness.

The fixed layer 21a is a layer where the magnetization direction is fixed. The magnetization direction of the fixed layer 21a is configured to be the same as the direction of the magnetic field leaking from the N-pole magnetizing portion of the magnetic scale 11, for example.

The free layer 21c is a layer where the magnetization direction is changed by the magnetism leaking from the magnetic scale 11. The free layer 21c are ferromagnetic layers, and the barrier layer 21b is an insulating layer. In the magnetic detecting element 21, the resistance value of the entire element 21 becomes small when the magnetization directions of the fixed layer 21a and the free layer 21c are the same, and the resistance value of the entire element 21 becomes large when the magnetization directions of the fixed layer 21a and the free layer 21c are opposite to each other. In such a manner, the resistance value of the magnetic detecting element 21 changes in a large amount according to the change of the magnetization direction of the free layer 21c. Moreover, by using the TMR element, it is possible to cause the length of one side in one magnetic detecting element 21 to have a very small size of approximately 2 μm to 10 μm.

Figure 5A:
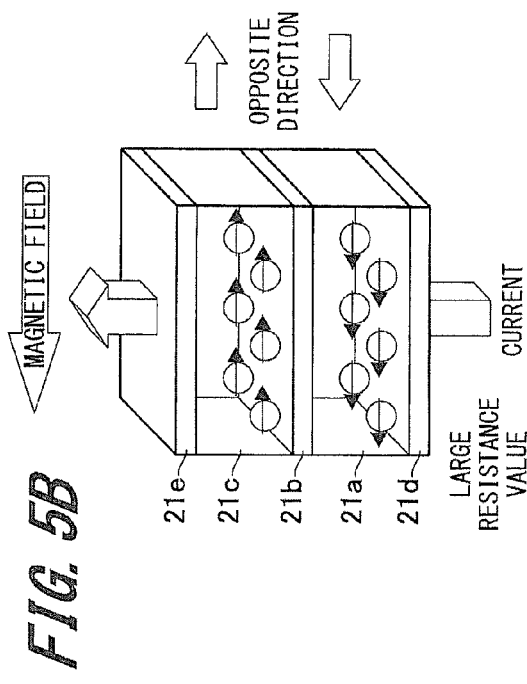
FIGS. 5A to 5C are explanatory diagrams showing an example of resistance value change of the magnetic detecting element according to the first embodiment of the present invention.
Figure 5B:
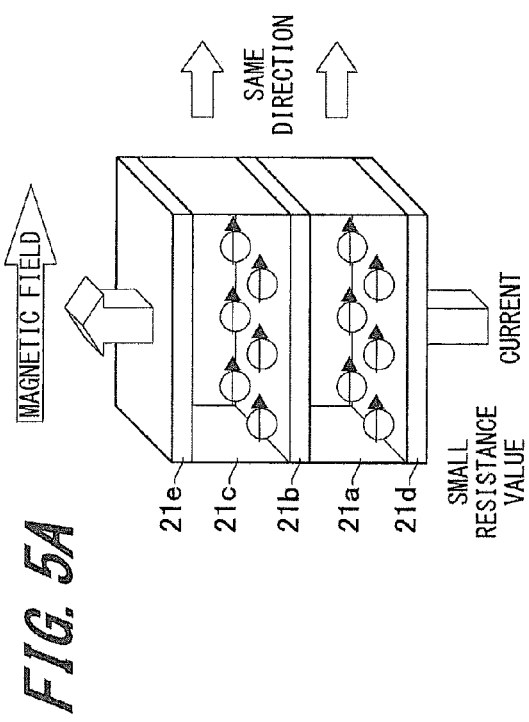
Figure 5C:
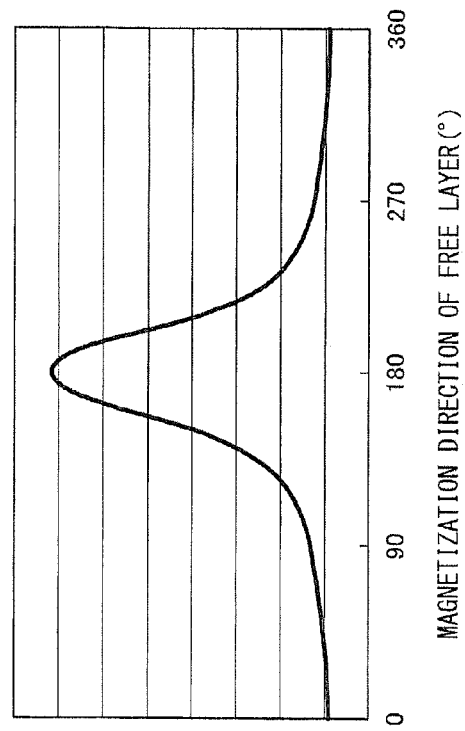

FIGS. 5A to 5C are diagrams showing a relationship between the magnetization direction in each of the layers of the magnetic detecting element 21 and the resistance value.

FIG. 5A shows the case that the magnetization direction of the fixed layer 21a and the magnetization direction of the free layer 21c are the same (e.g., case of detecting a magnetic field from the N-pole magnetizing portion 11N), and FIG. 5B shows the case that the magnetization direction of the fixed layer 21a and the magnetization direction of the free layer 21c are opposite to each other (e.g., case of detecting a magnetic field from the S-pole magnetizing portion 11S).

The graph shown in FIG. 5C shows the resistance value change according to magnetization direction change in the free layer 21c. It is the state shown in FIG. 5A that the magnetization direction of the free layer 21c is 0 degrees, and it is the state shown in FIG. 5B that the magnetization direction of the free layer 21c is 180 degrees.

As apparent from FIG. 5C, when the magnetization direction of the free layer 21c is 0 degrees, the resistance value of the magnetic detecting element 21 becomes minimum, and, when the magnetization direction of the free layer 21c is 180 degrees, the resistance value of the magnetic detecting element 21 becomes maximum. Then, as apparent from the characteristic curve shown in FIG. 5C, when the magnetization direction of the free layer 21c is between 0 degrees and 180 degrees, the resistance value is obtained according to an angle of the magnetization direction thereof.

[1-4. Connection State of the Magnetic Detecting Elements]

Figure 6:
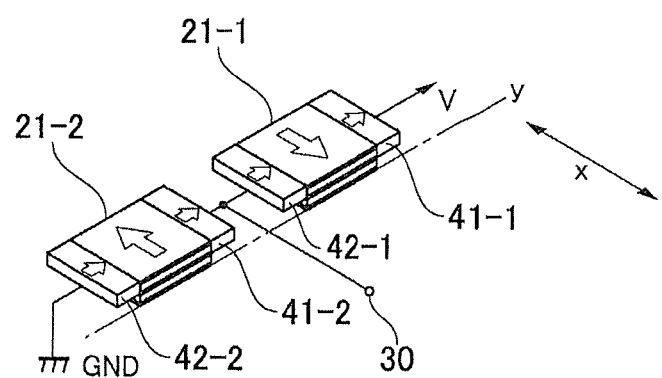
FIG. 6 is a configuration diagram showing a connection example of the magnetic detecting elements according to the first embodiment of the present invention.

FIG. 6 is a diagram showing a connection example of the two magnetic detecting elements 21-1 and 21-2 in the detecting section 20 shown in FIG. 1.

The two magnetic detecting elements 21-1 and 21-2 disposed side by side linearly in the width direction of the magnetic scale 11 (y-direction) are connected in series between a point where a predetermined voltage V is obtained and an earth potential portion GND, and a detection signal is taken out from a connection point of the two magnetic detecting elements 21-1 and 21-2 to a terminal 30. The signal obtained at the terminal 30 is the SIN signal detected from the magnetic scale 11.

In the two magnetic detecting elements 21-1 and 21-2, the magnetization directions of the fixed layers 21a are set to be opposite to each other. Specifically, as shown by the arrows on the respective magnetic detecting elements 21-1 and 21-2 in FIG. 6, the magnetization direction of the fixed layer 21a is determined to be in a direction parallel to the x-direction which is the longitudinal direction of the magnetic scale 11. Then, when the magnetization direction of the fixed layer 21a in the one magnetic detecting element 21-1 is set to a direction parallel to the x-direction, the magnetization direction of the fixed layer 21a in the other magnetic detecting element 21-2 is set to a direction opposite to the above direction (here, anti-parallel direction).

The bias magnetic field generating portions 41-1 and 42-1 are disposed on both sides of the magnetic detecting element 21-1, and the bias magnetic field generating portions 41-2 and 42-2 are disposed on both side of the magnetic detecting element 21-2. In each of the magnetic detecting elements 21-1 and 21-2, the bias magnetic fields applied by the two bias magnetic field generating portions 41-1 and 42-1, or 41-2 and 42-2 are set to have a direction parallel to the y-direction which is a direction perpendicular to the magnetization direction of the fixed layer 21a in each of the magnetic detecting elements 21-1 and 21-2, as shown by the arrow in FIG. 6.

[1-5. Example of the Influence Provided by the Bias Magnetic Field and the Scale Magnetic Field]

Figure 7A:
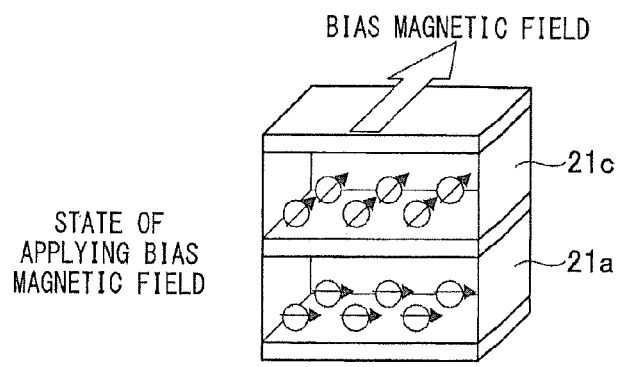
FIGS. 7A to 7D are explanatory diagrams showing influence provided by a bias magnetic field according to the first embodiment of the present invention.

FIGS. 7A to 7D are diagrams explaining the state that the resistance values of the respective magnetic detecting elements 21-1 and 21-2 are changed by the influence of the bias magnetic field and the scale magnetic field. FIG. 7A shows the state that only the bias magnetic field from the bias magnetic field generating portions 41 and 42 is applied to the free layer 21c. The direction of the bias magnetic field in the FIG. 7A is assumed to be a direction providing approximately the middle value between the maximum resistance value and the minimum resistance value, for example.

Figure 7B:
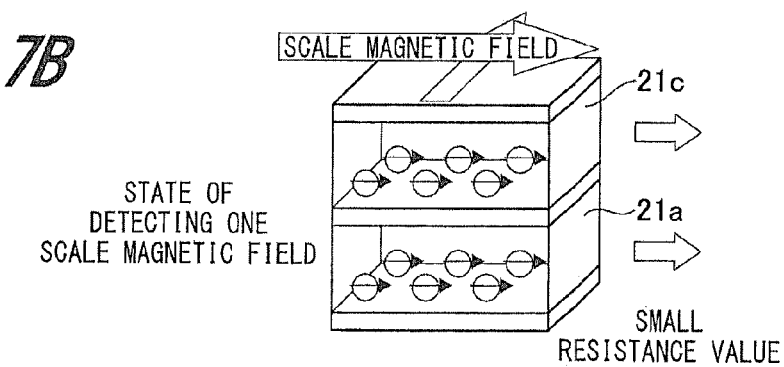
Figure 7C:
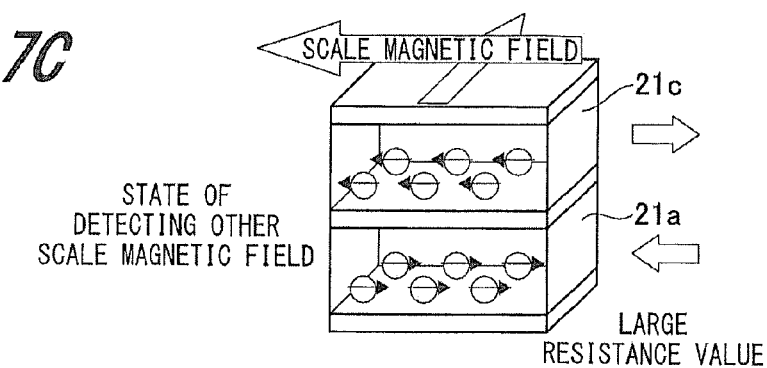

FIG. 7B and FIG. 7C show the states that one or the other magnetic field from the magnetic scale 11 is detected while the bias magnetic field is applied, respectively. In the state shown in FIG. 7B, the magnetization directions of the fixed layer 21a and the free layer 21c in the magnetic detecting element 21 are the same, and, in the state shown in FIG. 7C, the magnetization directions of the fixed layer 21a and the free layer 21c in the magnetic detecting element 21 are different by 180 degrees.

The magnetic detecting element 21 has the minimum resistance value Ra in the state shown in FIG. 7B, and has the maximum resistance value Rb in the state shown in FIG. 7C.

Figure 7D:
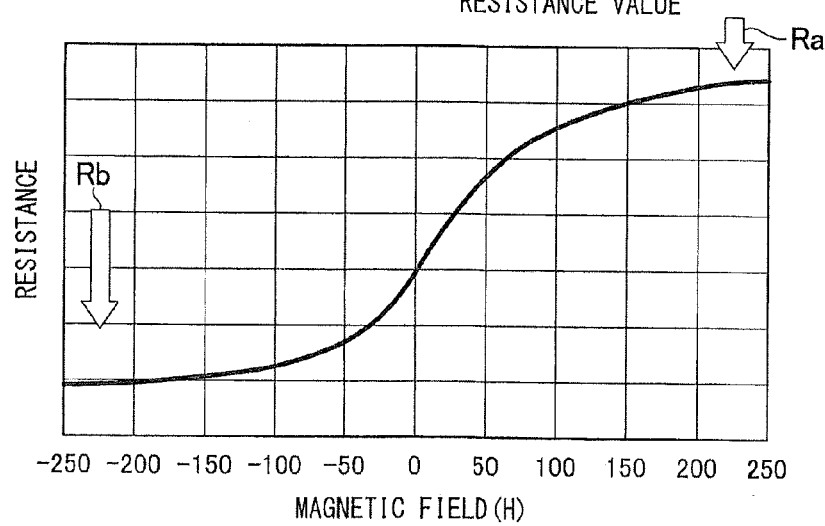

FIG. 7D is a diagram showing a relationship between the minimum resistance value Ra and the maximum resistance value Rb in the magnetic detecting element 21. Without the influence of the leakage magnetic field from the magnetic scale 11, the magnetic detecting element 21 has a resistance value of approximately the middle value between the minimum resistance value Ra and maximum resistance vale Rb.

[1-6. Example of the Detection Signal of the Magnetic Detecting Elements]

Figure 8A:
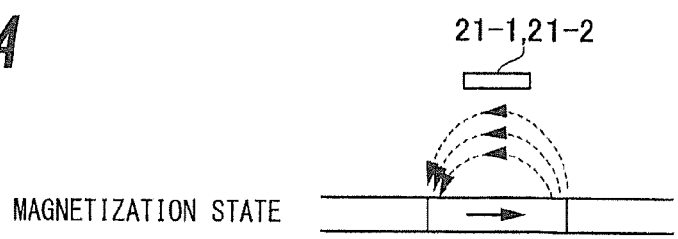
FIGS. 8A to 8C are characteristic diagrams showing a detection state of the magnetic detecting element according to the first embodiment of the present invention.
Figure 8B:
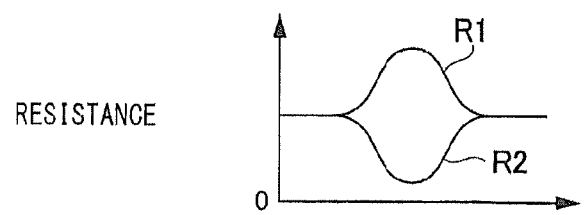
Figure 8C:
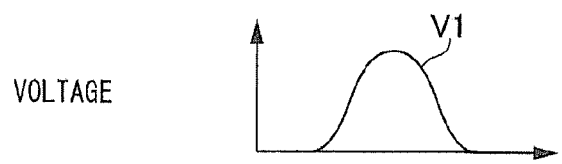

FIGS. 8A to 8C are diagrams showing an example of the signal obtained at the terminal 30 (FIG. 6) extracted from the connection point of the two magnetic detecting elements 21-1 and 21-2.

In FIG. 8A, the broken line shows the direction of the leakage magnetic field which provides influence from the magnetic scale 11 to the magnetic detecting elements 21-1 and 21-2. In FIG. 8A, the two magnetic detecting elements 21-1 and 21-2 are shown overlapping at the same position. FIG. 8B shows the state that the resistance values of the two magnetic detecting elements 21-1 and 21-2 are changed by the influence of the leakage magnetic field from the magnetic scale 11. The resistance value change characteristic R1 shows a characteristic of the magnetic detecting element 21-1 and the resistance value change characteristic R2 shows a characteristic of the magnetic detecting element 21-2. Here, as shown in FIG. 8B, the change direction of the resistance value change characteristic R1 in the magnetic detecting element 21-1 and the change direction of the resistance value change characteristic R2 in the magnetic detecting element 21-2 are opposite to each other.

FIG. 8C shows a change characteristic V1 of the voltage signal obtained at the terminal 30 (refer to FIG. 6). The voltage change characteristic V1 shows the highest voltage when the leakage magnetic field from one of the poles in the magnetic scale 11 is maximum. Then, the voltage decreases as the leakage magnetic field of the magnetic scale 11 decreases. When the relative positions of the magnetic detecting elements 21-1 and 21-2 change with respective to the magnetic scale 11, the voltage change characteristic is detected as a sine wave. However, the signal be a sine wave is an example in which the magnetic scale 11 is the one on which the N-pole and the S-pole are alternately recorded.

The SIN signal which is a sine wave obtained at the terminal 30 is supplied to the position detecting section 104 shown in FIG. 1. Further, the COS signal from a non-illustrated detecting section is supplied to the position detecting section 104. Operational processing using the SIN signal and COS signal is performed in the position detecting section 104, and the relative position of the detecting section 20 with respect to the magnetic scale 11 is calculated.

As explained above, according to the position detecting device of the present embodiment, since the two magnetic detecting elements 21-1 and 21-2 are disposed side by side in a direction perpendicular to the direction of scanning the scale for detecting the leakage magnetic field from the magnetic scale 11, the two magnetic detecting elements 21-1 and 21-2 are configured to detect the signal from the recording signal of the magnetic scale 11 at the same position. Accordingly, it is possible to obtain the signals having phases perfectly opposite to each other from the recording signal at the same position, as the signals detected by the two magnetic detecting elements 21-1 and 21-2, and to improve the performance of eliminating the external disturbance noise.

Further, also when the signal strength recorded on the magnetic scale 11 has a variation, the signal strength variation appears in the two magnetic detecting elements 21-1 and 21-2 at the same timing, and variation components can be cancelled. Accordingly, the signal strength variation does not provide a bad influence to the detection signal, and, also from such a point, a preferable detection signal is obtained and the position detection accuracy is improved.

2. Second Embodiment

In the following, there will be explained a second embodiment of the present invention with reference to FIG. 9 to FIG. 12. In the FIG. 9 to FIG. 12, the same sign is attached to a part corresponding to that of FIG. 1 to FIG. 8 which has been explained in the first embodiment, and the explanation thereof will be omitted.

In the second embodiment of the present invention, the entire configuration of a position detecting device employs the configuration shown in FIG. 1, for example. However, the arrangement state of the magnetic detecting elements 21 within the detecting section 20 is different from that of the first embodiment.

[2-1. Arrangement State and Connection State of the Magnetic Detecting Elements]

Figure 9:
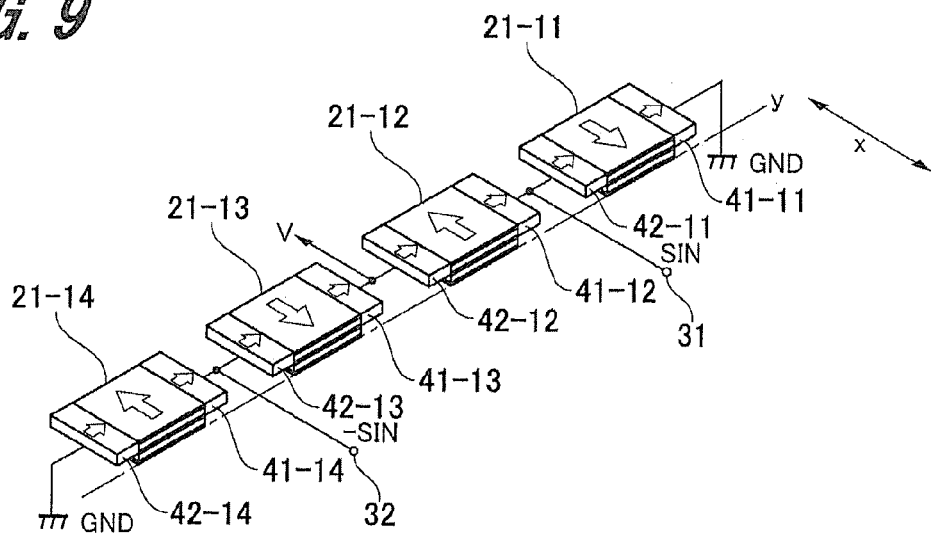
FIG. 9 is a configuration diagram showing an element arrangement example of a position detecting device according to a second embodiment of the present invention.

In the present example, as shown in FIG. 9, the detecting section 20 includes magnetic detecting elements 21-11, 21-12, 21-13, and 21-14. The four magnetic detecting elements 21-11, 21-12, 21-13, and 21-14 are arranged linearly in the width direction of the magnetic scale 11 (y-direction). The four magnetic detecting elements 21-11, 21-12, 21-13, and 21-14 are connected in series, and a predetermined voltage V is applied to the connection point of the two center magnetic detecting elements 21-12 and 21-13. Further, one end and the other end of a series circuit including the four magnetic detecting elements 21-11, 21-12, 21-13, and 21-14 are connected to the earth potential portion GND. Then, a SIN signal is taken out to a terminal 31 from the connection point of the magnetic detecting elements 21-11 and 21-12. Further, a −SIN signal is taken out to a terminal 32 from the connection point of the magnetic detecting elements 21-13 and 21-14.

In the four magnetic detecting elements 21-11, 21-12, 21-13, and 21-14, the magnetization detections of the respective fixed layers 21a are set to directions opposite to each other alternately. Specifically, as shown in FIG. 9 by the arrows on the respective magnetic detecting elements 21-11, 21-12, 21-13, and 21-14, the magnetization directions of the respective fixed layers 21a are set in a direction parallel to the x-direction which is the longitudinal direction of the magnetic scale 11. Then, when the magnetization directions of the respective fixed layers 21a of the magnetic detecting elements 21-11 and 21-13 are set in a direction parallel to the x-direction, the magnetization directions of the respective fixed layers 21a of the magnetic detecting elements 21-12 and 21-14 are set in a direction opposite thereto (here, anti-parallel direction).

Bias magnetic field generating portions 41-11 and 42-11 are disposed on both sides of the magnetic detecting element 21-11, and bias magnetic field generating portions 41-12 and 42-12 are disposed on both sides of the magnetic detecting element 21-12. Further, bias magnetic field generating portions 41-13 and 42-13 are disposed on both sides of the magnetic detecting element 21-13, and bias magnetic field generating portions 41-14 and 42-14 are disposed on both sides of the magnetic detecting element 21-14. As shown in FIG. 9 by the arrows, bias magnetic fields applied by the bias magnetic field generating portions 41-11 to 41-14 and 42-11 to 42-14 are set to have a direction parallel to the y-direction which is a direction perpendicular to the magnetization directions of the respective fixed layers 21a of the magnetic detecting elements 21-11, 21-12, 21-13, and 21-14.

Here, the four magnetic detecting elements 21-11, 21-12, 21-13, and 21-14 are disposed at positions equidistant from the surface of the magnetic scale 11 (not shown in FIG. 9).

[2-2. Example of a Circuit to Process the Detection Signal]

Figure 10:
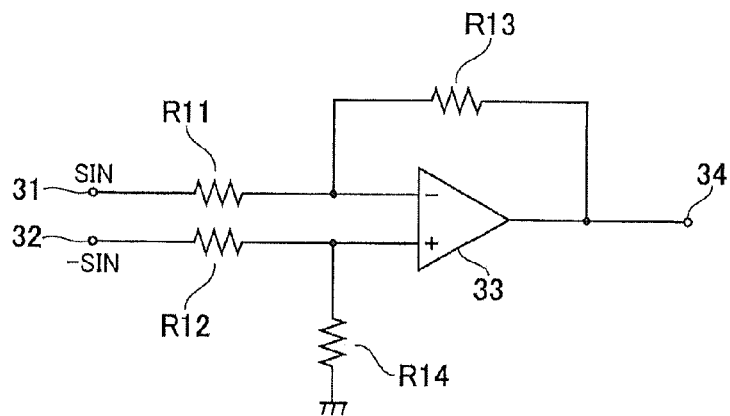
FIG. 10 is a configuration diagram showing an example of a circuit connected to a magnetic detecting element according to the second embodiment of the present invention.

FIG. 10 is a diagram showing a configuration example of a circuit to which the SIN signal and the –SIN signal obtained at the terminals 31 and 32 (FIG. 9) are supplied.

As shown in FIG. 10, the SIN signal obtained at the terminal 31 is supplied to an input terminal of an operational amplifier 33 on the minus side via a resistor R11. Further, the –SIN signal obtained at the terminal 32 is supplied to an input terminal of the operational amplifier 33 on the plus side via a resistor R12. The input terminal on the minus side and an output terminal of the operational amplifier 33 are connected by a resistor R13. Further, the input terminal of the operational amplifier 33 on the plus side is connected to the earth potential portion GND via a resistor R14.

The operational amplifier 33 shown in FIG. 10 functions as a differential amplifier to amplify a difference between the SIN signal obtained at the terminal 31 and the –SIN signal obtained at the terminal 32, and the amplified SIN signal is obtained at the output terminal. The SIN signal obtained at the output terminal of the operational amplifier 33 is supplied from an output terminal 34 to the position detecting section 104 (FIG. 1).

[2-3. Example of the Detection Signal from the Magnetic Detecting Element]

FIGS. 11A to 11D are diagrams showing an example of the signals obtained at the terminals 31 and 32 from the four magnetic detecting elements 21-11, 21-12, 21-13, and 21-14.

Figure 11A:
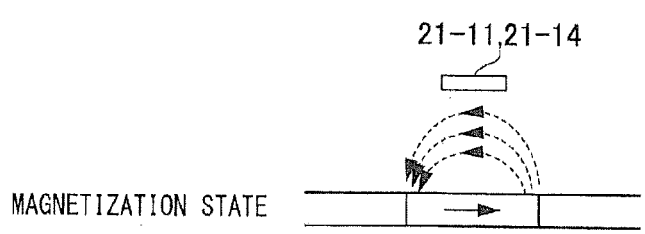
FIGS. 11A to 11D are characteristic diagrams showing a detection state of the magnetic detecting element according to the second embodiment of the present invention.
Figure 11B:
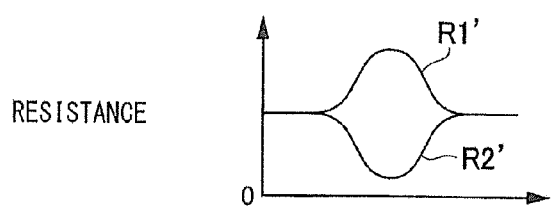

In FIG. 11A, the broken line shows the direction of a leakage magnetic field which provides influence from the magnetic scale 11 to the magnetic detecting elements 21-11, 21-12, 21-13, and 21-14. In FIG. 11A, the four magnetic detecting elements 21-11, 21-12, 21-13, and 21-14 are shown overlapping at the same position. FIG. 11B shows the state that the resistance values of the respective magnetic detecting elements 21-11, 21-12, 21-13, and 21-14 are changed by the influence of the leakage magnetic field from the magnetic scale 11. The resistance value change characteristic R1' shows characteristics of the magnetic detecting elements 21-11 and 21-13, and the resistance value change characteristic R2' shows characteristics of the magnetic detecting elements 21-12 and 21-14. Here, as shown in FIG. 11B, the change direction of the resistance value change characteristic R1' in the magnetic detecting elements 21-11 and 21-13 and the change direction of the resistance value change characteristic R2' in the magnetic detecting elements 21-12 and 21-14 are opposite to each other.

Figure 11C:
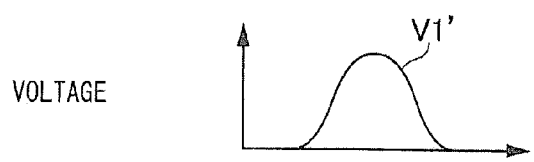

FIG. 11C shows a change characteristic V1' of the voltage signal obtained at the terminal 31. The voltage change characteristic V1' shows the highest voltage when the leakage magnetic field from one of the poles in the magnetic scale 11 is maximum. Then, the voltage decreases as the leakage magnetic field from the magnetic scale 11 decreases. When the relative positions of the respective magnetic detecting elements 21-11, 21-12, 21-13, and 21-14 change with respective to the magnetic scale 11, the change characteristic of the voltage is detected as a sine wave.

Figure 11D:
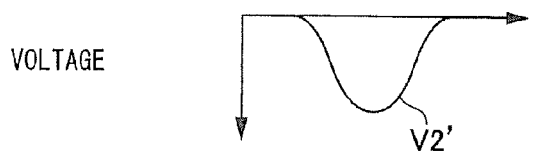

FIG. 11D shows a change characteristic V2' of the voltage signal obtained at the terminal 32. The voltage change characteristic V2' has a voltage change direction opposite to that of the change characteristic V1' shown in FIG. 11C. That is, when the voltage value shown in the change characteristic V1' is maximum in the plus direction, the voltage value shown in the change characteristic V2' becomes maximum in the minus direction.

Then, the SIN signal which is the sine wave obtained at the terminal 31 and the –SIN signal obtained at the terminal 32 are amplified in the operational amplifier 33 shown in FIG. 10, and the amplified SIN signal is obtained. Further, also a COS signal and a –COS signal obtained in an un-illustrated detecting section is differentially amplified in an operational amplifier and the amplified COS signal is obtained. For magnetic detecting elements for obtaining the COS signal and the –COS signal, there are used four magnetic detecting elements similar to those in the element arrangement shown in FIG. 9. Operational processing using the amplified SIN signal and COS signal is performed in the position detecting section 104 (FIG. 1) and the relative position of the detecting section 20 with respective to the magnetic scale 11 is calculated.

As explained above, according to the present embodiment, the SIN signal and the –SIN signal are obtained from the four magnetic detecting elements 21-11 to 21-14, and moreover the COS signal and the –COS signal are obtained from the other four magnetic detecting elements. Thus, the detection signal is obtained by a so-called bridge configuration. Accordingly, it is possible to realize preferable position detection without easily receiving the influence of noise or the like.

Moreover, since the magnetic detecting elements 21-11 to 21-14 are arranged linearly in a direction perpendicular to the direction of scanning the scale for detecting the leakage magnetic field from the magnetic scale 11, the magnetic detecting elements 21-11 to 21-14 are configured to detect the signals from the recording signal at the same position of the magnetic scale 11. Accordingly, the performance of eliminating the external disturbance noise can be improved and also the strength variation of the signal does not provide the bad influence to the detection signal, and therefore the position detection accuracy is improved.

[2-4. Example of an Arrangement for Two Divided Groups]

In the example of FIG. 9, the four magnetic detecting elements 21-11 to 21-14 are configured to be disposed side by side linearly. On the other side, when it is difficult to linearly arrange the four magnetic detecting elements 21-11 to 21-14 from the restriction of the width or the like of the magnetic scale 11, the two magnetic detecting elements 21-11 and 21-12 to obtain the SIN signal and the two magnetic detecting elements 21-13 and 21-14 to obtain the –SIN signal may be disposed at positions apart from each other by a half of one wavelength λ in the magnetic scale 11 (or integer multiple of a half wavelength λ/2: note that, in even number multiple, opposite voltages are applied).

Figure 12:
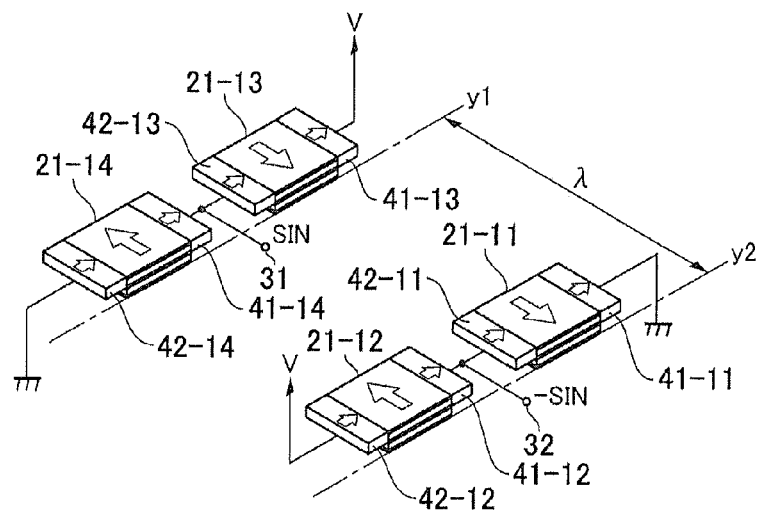
FIG. 12 is a configuration diagram showing a variation example of element arrangement in a position detecting device according to the second embodiment of the present invention.

FIG. 12 is a diagram showing a configuration example of such a case. The magnetic detecting elements 21-11, 21-12 are arranged linearly along the line y1 in a direction perpendicular to the longitudinal direction of the magnetic scale 11. Further, the magnetic detecting elements 21-13 and 21-14 are arranged linearly along the line y2 in a direction perpendicular to the longitudinal direction of the magnetic scale 11. Here, the line y1 and the line y2 have an interval of one wavelength λ (or integer multiple of one wavelength λ).

Then, a predetermined voltage V is supplied to the series circuit of the magnetic detecting elements 21-11 and 21-12. Further, the predetermined voltage V is applied also to the series circuit of the magnetic detecting elements 21-13 and 21-14. However, the voltage V is configured to be applied to the respective series circuits of the two magnetic detecting element groups in directions opposite to each other.

Further, the signal (SIN signal) obtained at the connection point of the magnetic detecting elements 21-11 and 21-12 is supplied to the terminal 31. Further, the signal (−SIN signal) obtained at the connection point of the magnetic detecting elements 21-13 and 21-14 is supplied to the terminal 32.

The signals obtained at the terminals 31 and 32 are supplied to the operational amplifier 33 shown in FIG. 10.

Also in the configuration shown in FIG. 12, both of the signals obtained at the terminals 31 and 32 are signals detected from the recording signal at the same position, and it is possible to eliminate the influence of the noise and the bad influence caused by the signal strength variation. Here, to the four magnetic detecting elements 21-11 to 21-14, as shown in FIG. 12, the bias magnetic field generating portions 41-11 and 42-11, 41-12 and 42-12, 41-13 and 42-13, and 41-14 and 42-14 are disposed individually to apply the bias magnetic fields, respectively.

3. Example Applied to Another Magnetic Scale

In the first and second embodiments, the present invention is applied to a so-called incremental track in which the N-pole magnetizing portions 11N and the S-pole magnetizing portions 11S are contiguously arranged at a certain interval, as the magnetic scale 11. On the other side, the present invention may be applied to a magnetic scale having another track configuration.

Figure 13:
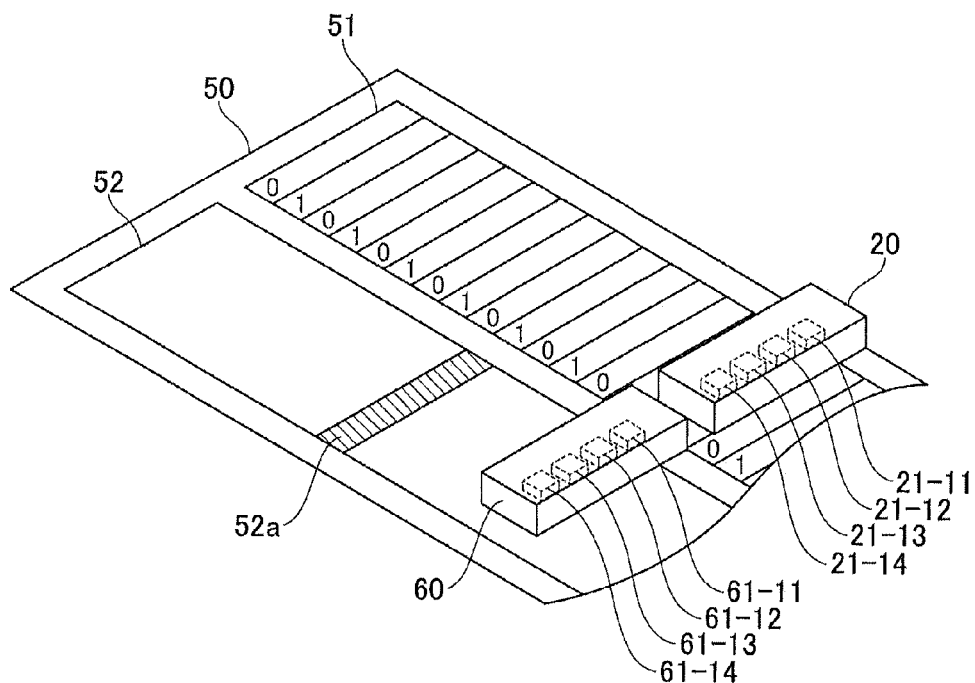
FIG. 13 is a perspective view showing an example of applying an embodiment of the present invention to an origin track.

FIG. 13 shows an example of a magnetic scale 50 in which an incremental track 51 and an origin track 52 are disposed in parallel.

In the incremental track 51, N-pole-magnetizing portions (e.g., portions indicated as "0"), and S-pole-magnetizing portions (e.g., portions indicated as "1") are contiguously arranged alternately at a certain interval. Then, as in the example shown in FIG. 9, for example, in the detecting section 20 to detect the incremental track 51, four magnetic detecting elements 21-11, 21-12, 21-13, and 21-14 are disposed in the width direction perpendicular to the longitudinal direction of the magnetic scale 50. The connection state of the four magnetic detecting elements 21-11, 21-12, 21-13, and 21-14 is the same as that in the example of FIG. 9. Further, while omitted from FIG. 13, bias magnetic field generating portions are disposed neighboring the four magnetic detecting elements 21-11 to 21-14, respectively, as in the example of FIG. 9.

The origin track 52 records an origin signal 52a magnetically at one specific position. The recording state of the origin signal 52a may be a state as one magnet is recorded as shown in FIG. 8A as an example. Then, four magnetic detecting elements 61-11, 61-12, 61-13, and 61-14 are disposed in the width direction perpendicular to the longitudinal direction of the magnetic scale 50 also in a detecting section 60 to detect the origin signal 52a. The detecting section 60 moves integrally with the detecting section 20.

The connection state of the four magnetic detecting elements 61-11, 61-12, 61-13, and 61-14 is the same as the connection state of the four magnetic detecting elements 21-11 to 21-14 in the detecting section 20 (state shown in FIG. 9). Further, while omitted from FIG. 13, bias magnetic field generating portions are disposed neighboring the respective magnetic detecting elements 61-11 to 61-14.

By the configuration shown in FIG. 13, the detection accuracy of the origin signal 25a recorded on the origin track 52 is improved in the detecting section 60.

Figure 14:
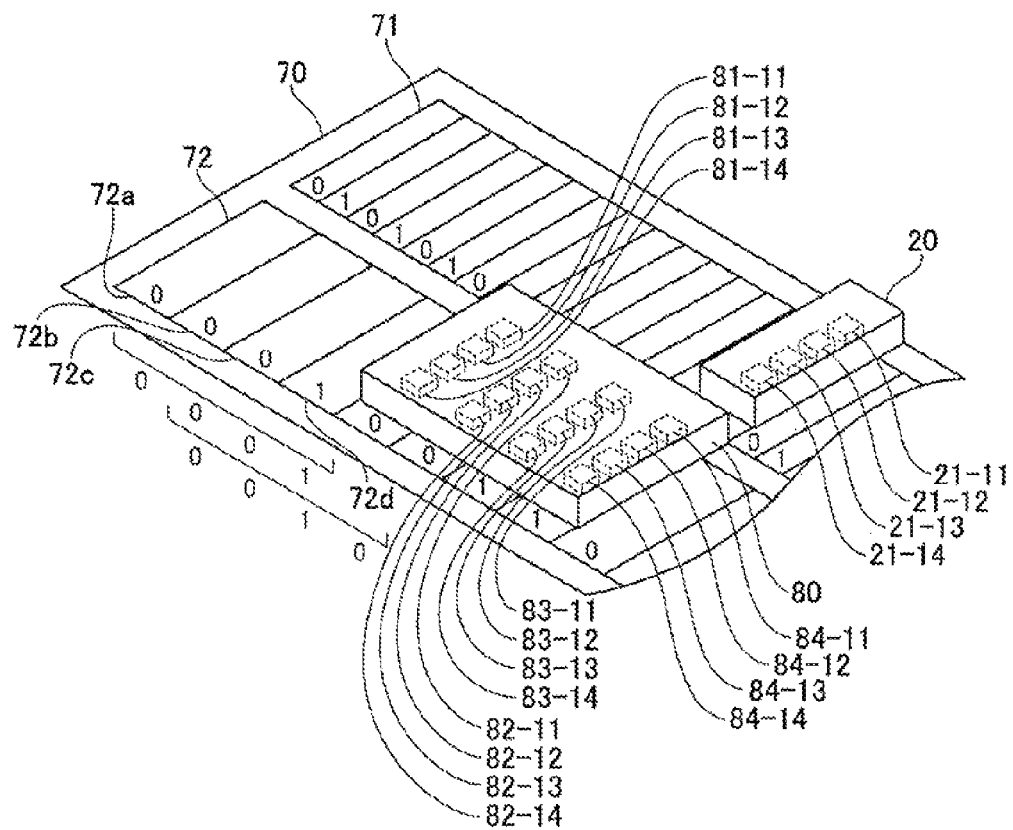
FIG. 14 is a perspective view showing an example of applying an embodiment of the present invention to an absolute track.
Figure 15:
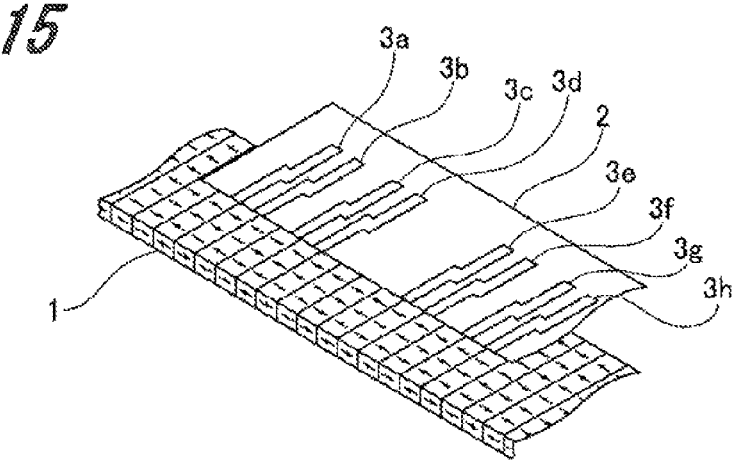
FIG. 15 is an explanatory diagram showing an arrangement example of a magnetic scale and magnetic detecting elements in a conventional position detecting device.
Figure 16:
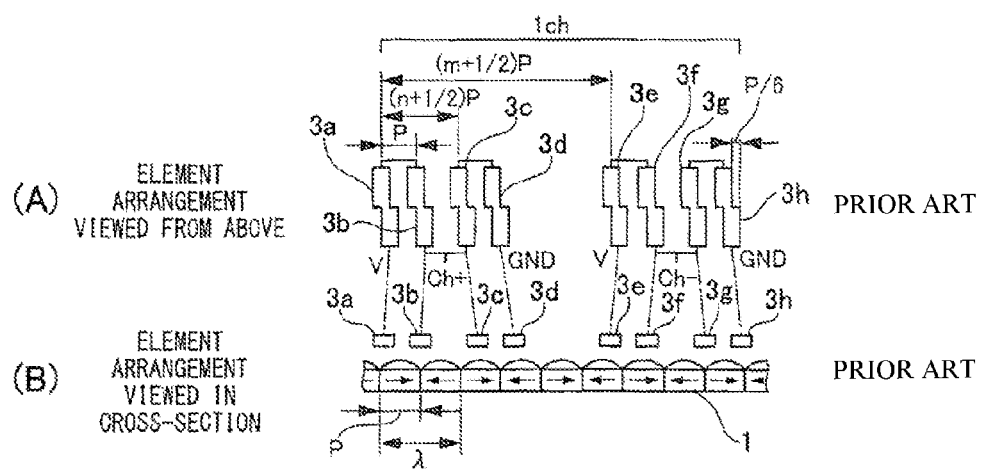
FIG. 16 is a plan view (FIG. 16A) and a cross-sectional view (FIG. 16B) showing details of an arrangement state of the magnetic detecting elements shown in FIG. 15.
Figure 17:
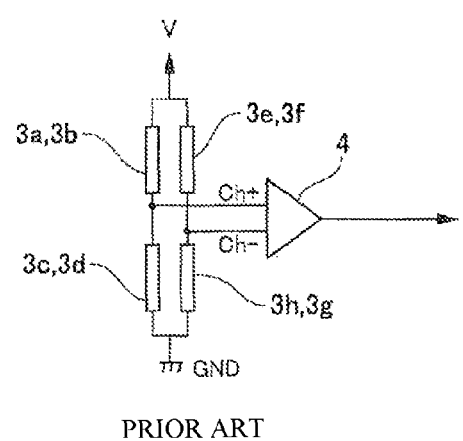
FIG. 17 is a configuration diagram showing a conventional connection example of the magnetic detecting elements.

FIG. 14 shows an example in which an incremental track 71 and an absolute track 72 are disposed in parallel as a magnetic scale 70.

The configuration of the incremental track 71 is the same as that of the incremental track 51 shown in FIG. 13, and also the detecting section 20 to detect the incremental track 71 has the same configuration as that in the example of FIG. 13.

In the absolute track 72, predetermined signals are recorded at respective recording portions 72a, 72b, 72c, . . . , and detected by a detecting section 80. The detecting section 80 moves integrally with the detecting section 20.

The absolute track 72 records signals of 000100110 . . . sequentially from the left end in the example of FIG. 14. Then, the detecting section 80 detects the signals of four contiguous recording portions at the same time, for example. Accordingly, in the example of FIG. 14, for example, the detecting section 80 is configured to detect four-bit data "0001" by detecting the signals of the four recording portions on the left end, for example. Further, the detecting section 80 is configured to detect four-bit data "0010" when the recording portion is shifted by one to the right. In such a manner, the detecting section 80 is configured to detect different data at each position, and the relative position of the detecting section 80 with respect to the absolute track 72 can be determined from the detected data.

The detecting section 80 to perform such four-bit detection includes four magnetic detecting elements disposed side by side in a direction perpendicular to the longitudinal direction of the magnetic scale 70 for each of the bit detection positions. That is, the detecting section 80 includes four magnetic detecting elements 81-11, 81-12, 81-13, and 81-14 disposed side by side in a direction perpendicular to the longitudinal direction of the magnetic scale 70. Further, the detecting section 80 includes four magnetic detecting elements 82-11 to 82-14, four magnetic detecting elements 83-11 to 83-14, and four magnetic detecting elements 84-11 to 84-14 in addition to the four magnetic detecting elements 81-11 to 81-14, at positions apart from each other by one bit.

The connection states of the four magnetic detecting elements 81-11 to 81-14, the four magnetic detecting elements 82-11 to 82-14, the four magnetic detecting elements 83-11 to 83-14, and the four magnetic detecting elements 84-11 to 84-14 are the same as the connection state of the four magnetic detecting elements 21-11 to 21-14 in the detecting section 20 (state shown in FIG. 9). Further, while omitted from FIG. 14, bias magnetic field generating portions are also disposed neighboring the respective magnetic detecting elements 81-11 to 81-14, 82-11 to 82-14, 83-11 to 83-14, and 84-11 to 84-14.

By the configuration shown in FIG. 14, the detection accuracy of the signal recorded on the absolute track 72 is improved in the detecting section 80.

In the examples of FIG. 13 and FIG. 14, each of the detecting sections 60 and 80 is an example in which the four magnetic detecting elements are arranged linearly as in the example of FIG. 9. On the other side, each of the detecting sections 60 and 80 may be an example in which two magnetic detecting elements are arranged in a direction perpendicular to the longitudinal direction of the scale as in the example of FIG. 2. Further, while, each of the examples of FIG. 13 and FIG. 14 is an example in which the incremental track and origin track or the absolute track are arranged in parallel, the present invention may be applied to a magnetic scale in which only the origin track or the absolute track is disposed.

4. Other Variation Examples

Note that, while one wavelength of the recording signal on the magnetic scale is shown to be 400 μm in the above embodiments, the value of the one wavelength may be selected appropriately in a range of approximately several ten microns to several hundred microns according to the resolving power of the position measurement required for a position detecting device.

For the size of the individual magnetic detecting element, one side length of approximately 2 μm to 10 μm is one example, and a magnetic detecting element may be used having a size larger or smaller than the above size.

Further, in the above embodiments, the bias magnetic field generating portions 41 and 42 are disposed on both sides of each of the magnetic detecting elements 21. On the other side, a bias magnetic field generating portion applying a bias magnetic field to plural magnetic detecting elements (e.g., magnetic detecting elements 21-1 and 21-2 shown in FIG. 2) may be disposed and the number of bias magnetic field generating portions may be reduced.

Further, while, in the above embodiments, the TMR element utilizing the tunnel magneto-resistance effect is used as the magnetic detecting element, an element having another configuration may be used if the element has a characteristic similar to the resistance which changes when the magnetism is applied to the element.

Further, the above embodiments explain the examples of the application to the position detecting device having the linear scale. On the other side, by a circular arrangement of the magnetic scale, the present invention may be applied to a position detecting device to detect the relative rotational angle of the head with respect to the scale. The configuration of FIG. 1 where the scale is shown for the linear position detecting device is just one example, and the present invention can be applied to a position detecting device for other various kinds of equipment.

EXPLANATION OF THE SIGNS

1: Magnetic scale, 2: Detecting section. 3*a* to 3*h*: Magnetic detecting element, 4: Operational amplifier, 11: Magnetic scale, 11N: N-pole magnetizing portion, 11S: S-pole magnetizing portion, 20:D detecting section, 21, 21-1 to 21-2, 21-11 to 21-14: Magnetic detecting element, 21*a*: Fixed layer, 21*b*: Barrier layer, 21*c*: Free layer, 33: Operational amplifier, 41, 42, 41-1, 41-2, 42-1, 42-2, 41-11 to 41-14, 42-1, 42-2, 42-11 to 42-14: Bias magnetic field generating portion, 50: Magnetic scale, 51: Incremental track, 52: Origin track, 52*a*: Origin signal, 60: Detecting section, 61-11 to 61-14: Magnetic detecting element, 70: Magnetic scale, 71: Incremental track, 72: Absolute track, 80: Detecting section, 81-11 to 81-14, 82-11 to 82-14, 83-11 to 83-14, 84-11 to 84-14: Magnetic detecting element, 100: Device, 101: Fixed portion, 102: Movable stage, 103: Object to be machined, 104: Position detecting section, 105: Machining tool, 106: Driving section, 107: Controlling section, 108: Target position inputting section

What is claimed is:

1. A position detecting device, comprising:
a scale having a magnetic signal magnetically recorded on a magnetic medium;
a magnetic detector having:
first and second magnetic detecting elements disposed to be able to scan a magnetic signal recording surface of the scale and configured to detect leakage magnetism from the scale, the first and second magnetic detecting elements each having:
a magneto-resistance effect element, the first and second magnetic detecting elements being configured such that a resistance value of the first magnetic detecting element decreases when a resistance value the second magnetic detecting element increases with respect to magnetism applied to the first and second magnetic detecting elements, the first and second magnetic detecting elements being disposed side by side in a direction perpendicular to a direction of scanning the magnetic signal recording surface and being disposed at positions approximately equidistant from the magnetic signal recording surface, and each of the first and second magnetic detecting elements being configured such that a resistance value thereof becomes approximately a middle of a minimum resistance value and a maximum resistance value thereof when leakage magnetism from the scale is not detected by that magnetic detecting element; and
first and second magnetic layers sandwiching a barrier layer with a magnetization direction of its first magnetic layer being fixed in parallel or anti-parallel to a position detection direction, and a magnetization direction of its second magnetic layer being determined by the leakage magnetism from the scale to be in parallel or anti-parallel to the position detection direction, the first magnetic detecting element having the magnetization direction of its first magnetic layer set in a first parallel or anti-parallel direction and the second magnetic detecting element having the magnetization direction of its first magnetic layer set in a second parallel or anti-parallel direction opposite to the first direction; and
a bias magnetic field generating portion which applies a bias magnetic field having a magnetization direction orthogonal to the magnetization direction of its second magnetic layer to its second magnetic layer and causes the magnetization direction of its second magnetic layer to be different from the magnetization direction of its first magnetic layer in a state without the leakage magnetism from the scale; and
a position detector configured to detect a relative position between the magnetic detector and the scale using a signal outputted from a middle point of a series connection of the first and second magnetic detecting elements.

2. A position detecting device, comprising:
a scale having a magnetic signal magnetically recorded on a magnetic medium;
a magnetic detector having:
first and second magnetic detecting elements disposed to be able to scan a magnetic signal recording surface of the scale and configured to detect leakage magnetism from the scale, the first and second magnetic detecting elements each having:
  a magneto-resistance effect element, the first and second magnetic detecting elements being configured such that a resistance value of the first magnetic detecting element decreases when a resistance value the second magnetic detecting element increases with respect to magnetism applied to the first and second magnetic detecting elements, the first and second magnetic detecting elements being disposed side by side in a direction perpendicular to a direction of scanning the magnetic signal recording surface and being disposed at positions approximately equidistant from the magnetic signal recording surface, and each of the first and second magnetic detecting elements being configured such that a resistance value thereof becomes approximately a middle of a minimum resistance value and a maximum resistance value thereof when leakage magnetism from the scale is not detected by that magnetic detecting element; and
  first and second magnetic layers sandwiching a barrier layer with a magnetization direction of its first magnetic layer being fixed in parallel or anti-parallel to a position detection direction, and a magnetization direction of its second magnetic layer being determined by the leakage magnetism from the scale, the first magnetic detecting element having the magnetization direction of its first magnetic layer set in a first parallel or anti-parallel direction and the second magnetic detecting element having the magnetization direction of its first magnetic layer set in a second parallel or anti-parallel direction opposite to the first direction; and
third and fourth magnetic detecting elements disposed side by side in the direction perpendicular to the direction of scanning the magnetic signal recording surface, magnetization directions of the first magnetic layers in the first and second magnetic detecting elements being set to the first direction and the second direction, respectively, and magnetization directions of first magnetic layers in the third and fourth magnetic detecting elements are set to the first direction and the second direction, respectively, and a signal outputted from a middle point of a series connection of the first magnetic detecting element and the second magnetic detecting element and a signal outputted from a middle point of a series connection of the third magnetic detecting element and the fourth magnetic detecting element being configured to be signals inverted from each other; and
a position detector configured to detect a relative position between the magnetic detector and the scale using a signal outputted from a middle point of a series connection of the first and second magnetic detecting elements.

* * * * *